(12) United States Patent
Kojima et al.

(10) Patent No.: US 7,992,938 B2
(45) Date of Patent: Aug. 9, 2011

(54) SEAT RECLINING APPARATUS FOR VEHICLE

(75) Inventors: Yasuhiro Kojima, West Bloomfield, MI (US); Hideo Nihonmatsu, Anjo (JP); Mikihito Nagura, Okazaki (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 209 days.

(21) Appl. No.: 12/250,190

(22) Filed: Oct. 13, 2008

(65) Prior Publication Data

US 2009/0096269 A1 Apr. 16, 2009

(30) Foreign Application Priority Data

Oct. 16, 2007 (JP) .................................. 2007-268508

(51) Int. Cl.
*B60N 2/235* (2006.01)
(52) U.S. Cl. ................................. 297/354.12; 297/367 P
(58) Field of Classification Search ............. 297/354.12, 297/367 R, 367 P, 362
See application file for complete search history.

(56) References Cited

U.S. PATENT DOCUMENTS

| | | | | |
|---|---|---|---|---|
| 4,541,672 | A * | 9/1985 | Fukuta et al. ............. | 297/367 R |
| 5,090,264 | A * | 2/1992 | Droulon et al. ........... | 74/411 |
| 5,967,611 | A * | 10/1999 | York et al. ................ | 297/368 |
| 6,023,994 | A * | 2/2000 | Yoshida ..................... | 74/530 |
| 6,543,849 | B1 * | 4/2003 | Yamada ..................... | 297/363 |
| 6,712,429 | B2 * | 3/2004 | Villarroel ................... | 297/361.1 |
| 6,854,802 | B2 * | 2/2005 | Matsuura et al. ......... | 297/367 R |
| 7,195,318 | B2 * | 3/2007 | Cha et al. ................. | 297/367 R |
| 7,699,397 | B2 * | 4/2010 | Andou et al. ............. | 297/354.12 |
| 2004/0262969 | A1 | 12/2004 | Sasaki et al. | |
| 2006/0145522 | A1 * | 7/2006 | Yamada ..................... | 297/367 |
| 2007/0145801 | A1 | 6/2007 | Yamada et al. | |

FOREIGN PATENT DOCUMENTS

| | | |
|---|---|---|
| FR | 2 772 318 | 6/1999 |
| JP | 8-154769 A | 6/1996 |
| JP | 9-117338 A | 5/1997 |
| JP | 2006-333967 | 12/2006 |
| JP | 2007-252451 A | 10/2007 |

OTHER PUBLICATIONS

Office Action issued Jan. 19, 2011, in China Patent Application No. 200810167977.7 (with English-language Translation).
Office Action issued Apr. 22, 2011, in Japanese Application No. 2007-268508, filed Oct. 16, 2007 with an English Translation.

* cited by examiner

*Primary Examiner* — Peter R. Brown
(74) *Attorney, Agent, or Firm* — Oblon, Spivak, McClelland, Maier & Neustadt, L.L.P.

(57) ABSTRACT

A seat reclining apparatus includes a pair of first arms, a pair of second arms, a pair of hinge pins, a pair of reclining mechanisms including a pair of lock mechanisms, each of which includes a cam, the lock mechanism restricting a rotational movement of the seat back relative to the seat cushion and releasing a restriction of the rotational movement, by means of a rotational movement of the hinge pins and the cams, and a connecting member provided between the reclining mechanisms and connected to the hinge pins, wherein each of the hinge pins is structured so as to be inserted into each of the reclining mechanisms from an inward of the seat, and a connecting portion is provided at an inner end of at least one of the hinge pins facing the other one of the hinge pins and is connected to the connecting member.

9 Claims, 5 Drawing Sheets

US 7,992,938 B2

SEAT RECLINING APPARATUS FOR VEHICLE

CROSS REFERENCE TO RELATED APPLICATIONS

This application is based on and claims priority under 35 U.S.C. §119 to Japanese Patent Application 2007-268508, filed on Oct. 16, 2007, the entire contents of which is incorporated herein by reference.

FIELD OF THE INVENTION

The present invention relates to a seat reclining apparatus for a vehicle.

BACKGROUND

According to a known seat apparatus for a vehicle, left and right lower arms, which are attached to a seat cushion, are provided on a vehicle floor. Left and right upper arms, which are attached to a seat back, are supported by back portions of the corresponding lower arms so as to pivot about corresponding hinge pins. A left reclining mechanism is provided between the left lower arm and the left upper arm. Likewise, a right reclining mechanism is provided between the right lower arm and the right upper arm. The left and right reclining mechanisms restrict pivotal movements of the corresponding upper arms and release the restriction of the pivotal movement thereof.

A known seat reclining apparatus for a vehicle disclosed in JP2006-333967A (which is hereinbelow referred to as reference 1) includes the left and right reclining mechanisms respectively provided at left and right sides of the seat cushion in order to obtain a supporting strength of the seat back. In such structured seat reclining apparatus for a vehicle, when a seat back angle is adjusted, the left and right reclining mechanisms are operated synchronously to lock and unlock the pivotal movements of the corresponding upper arms. In order to synchronize operations of the left and right reclining mechanisms, the reclining mechanisms are connected to each other through a pipe-shaped connecting shaft.

According to the seat reclining apparatus disclosed in reference 1, left and right operating shafts are respectively inserted into the left and right reclining mechanisms from an outward of a vehicle seat. An end portion of the left operating shaft and that of the right operating shaft are respectively connected to left and right end portions of the pipe-shaped connecting shaft via welding portions 22. Cams are engaged with the corresponding operating shafts. First teeth portions are formed at outer surfaces of lock members. Second teeth portions are formed at inner surfaces of rotating members. The first teeth portions are engaged with and released from the corresponding second teeth portions by means of a rotational movement of the cam. When an operating knob provided at an end potion of either left or right operating shaft, is operated, the left and right reclining mechanisms synchronously perform locking and unlocking operations.

However, according to the seat reclining apparatus (for the vehicle) disclosed in reference 1, the left and right operating shafts are respectively inserted into the left and right reclining mechanisms from the outward of the vehicle seat before the operating shafts and the connecting shaft are connected by welding. Therefore, the operating shafts and the connecting shaft are connected by welding in a state where the operating shafts are not stably positioned. As a result, the operating shafts may be eccentrically connected to the connecting shaft. Then, the locking and unlocking operations of the lock mechanisms may malfunction. Further, the seat reclining apparatus for the vehicle according to reference 1 does not include clearances, which are provided between the left reclining mechanism and the left operating shaft and between the right reclining mechanism and the right operating shaft, and which offset positional variations between the left and right reclining mechanisms. Therefore, the locking and unlocking operations of the lock mechanisms may further malfunction.

A need thus exists for a seat reclining apparatus for a vehicle which is not susceptible to the drawback mentioned above.

SUMMARY OF THE INVENTION

According to an aspect of the invention, a seat reclining apparatus for a vehicle includes a pair of first arms adapted to be supported by a seat cushion of a seat, a pair of second arms adapted to be supported by a seat back of the seat and rotatably supported relative to the first arms, pair of hinge pins inserted thorough the first arms and the second arms, a pair of reclining including a pair of lock mechanisms, each of which includes a cam provided between the first arm and the second arm and supported by the hinge pin so as to be integrally rotatable, keeping a clearance between the cam and the hinge pin, the lock mechanism restricting a rotational movement of the seat back relative to the seat cushion and releasing a restriction of the rotational movement of the seat back relative to the seat cushion, by means of a rotational movement of the hinge pins and the cams, and a connecting member provided between the reclining mechanisms and connected to the hinge pins so as to be integrally rotatable, wherein each of the hinge pins is structured so as to be inserted into each of the reclining mechanisms from an inward of the seat, and a connecting portion is provided at an inner end of at least one of the hinge pins facing the other one of the hinge pins and is connected to the connecting member.

BRIEF DESCRIPTION OF THE DRAWINGS

The foregoing and additional features and characteristics of the present invention will become more apparent from the following detailed description considered with the reference to the accompanying drawings, wherein.

DETAILED DESCRIPTION

First Embodiment

Figure 1:
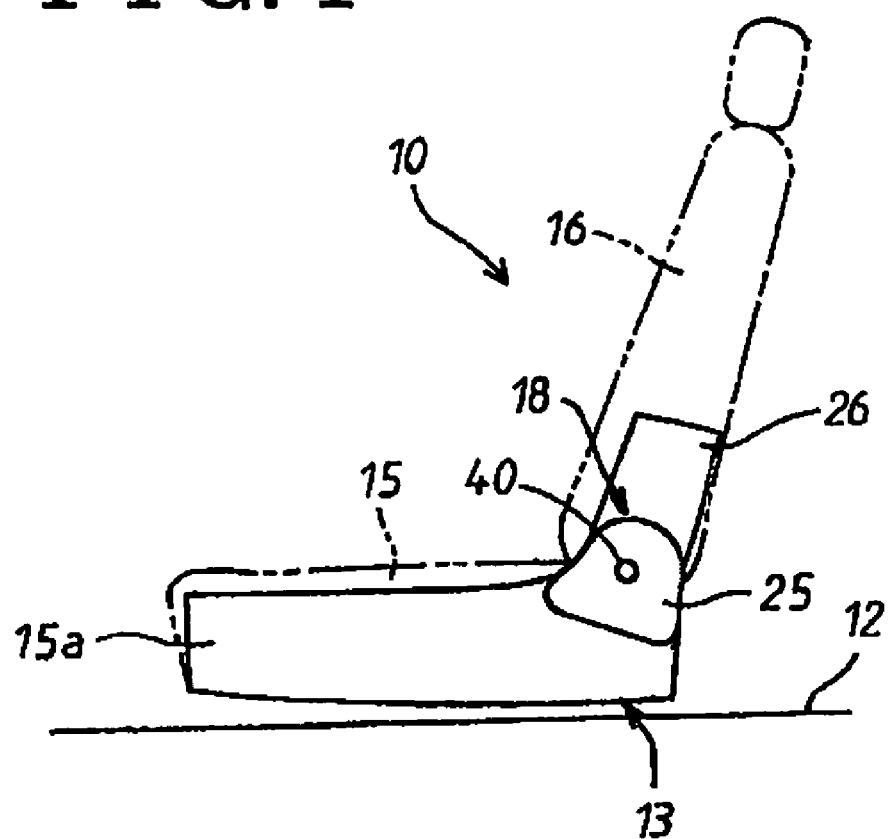
FIG. 1 illustrates a vehicle seat having a seat reclining apparatus for a vehicle according to a first embodiment.

An embodiment of a seat reclining apparatus for a vehicle 10 (which is hereinbelow referred to as a reclining apparatus 10) will be described hereinbelow with reference to the attached drawings. As illustrated in FIG. 1, the reclining apparatus 10 is provided to a vehicle seat 13 (which serves as a seat). The vehicle seat 13 includes a seat cushion 15 which forms a seating surface and a seat back 16 which forms a back rest surface. The reclining apparatus 10 includes left and right reclining mechanisms 18. The left and right reclining mechanisms 18 respectively include left and right lock mechanisms 17 which restrict a pivotal movement of the seat cushion 15 relative to the seat back 16 and release the restriction of the pivotal movement thereof. The seat back 16 is supported by a rear portion of the seat cushion 15 so as to be pivotally movable relative to the seat cushion 15 in a front-rear direction of the vehicle and so as to be retained at a predetermined adjusted angle. Herein, directions, such as upper, lower, left, right, front and rear correspond to an orientation of the vehicle.

Figure 2:
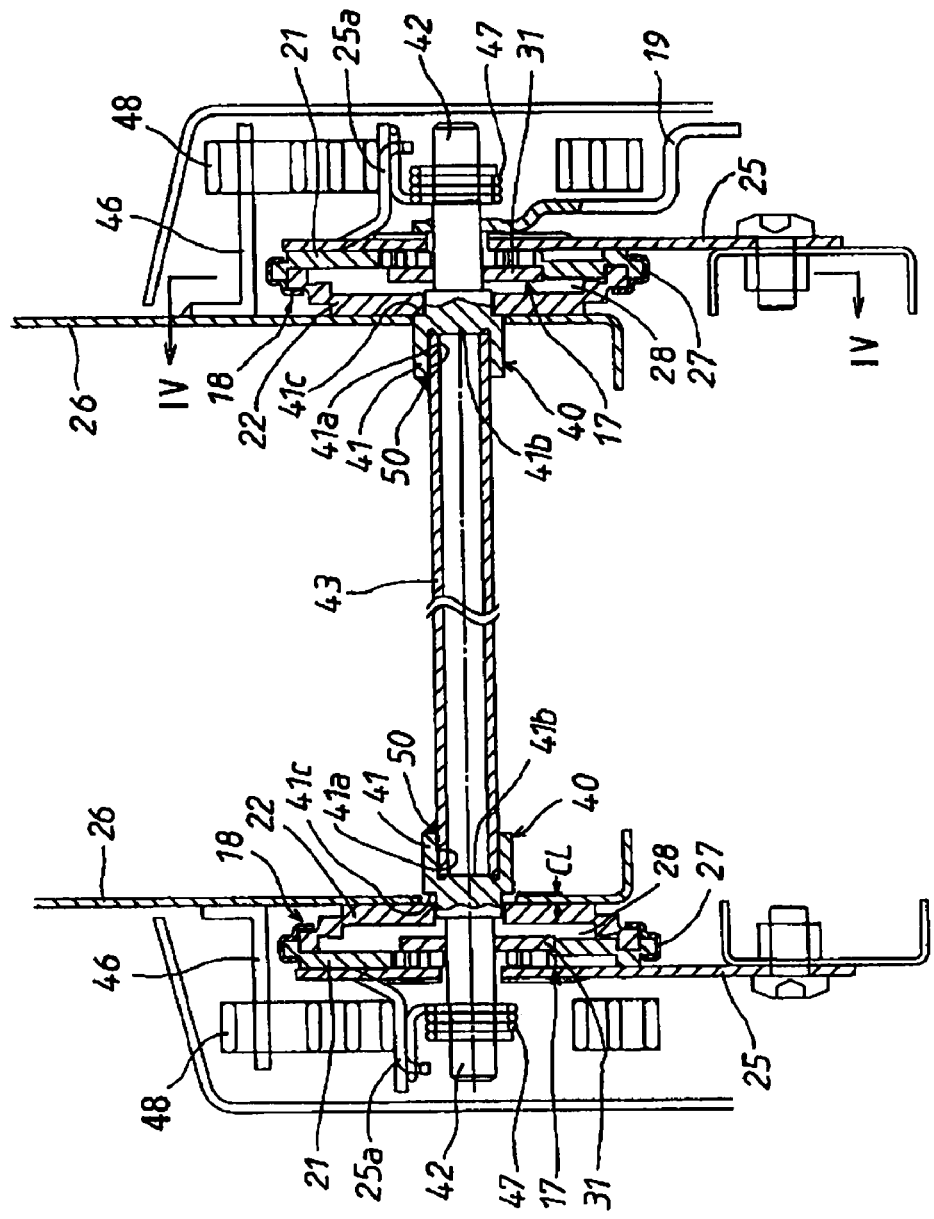
FIG. 2 is a cross-sectional view illustrating the seat reclining apparatus for the vehicle according to the first embodiment.
Figure 3:
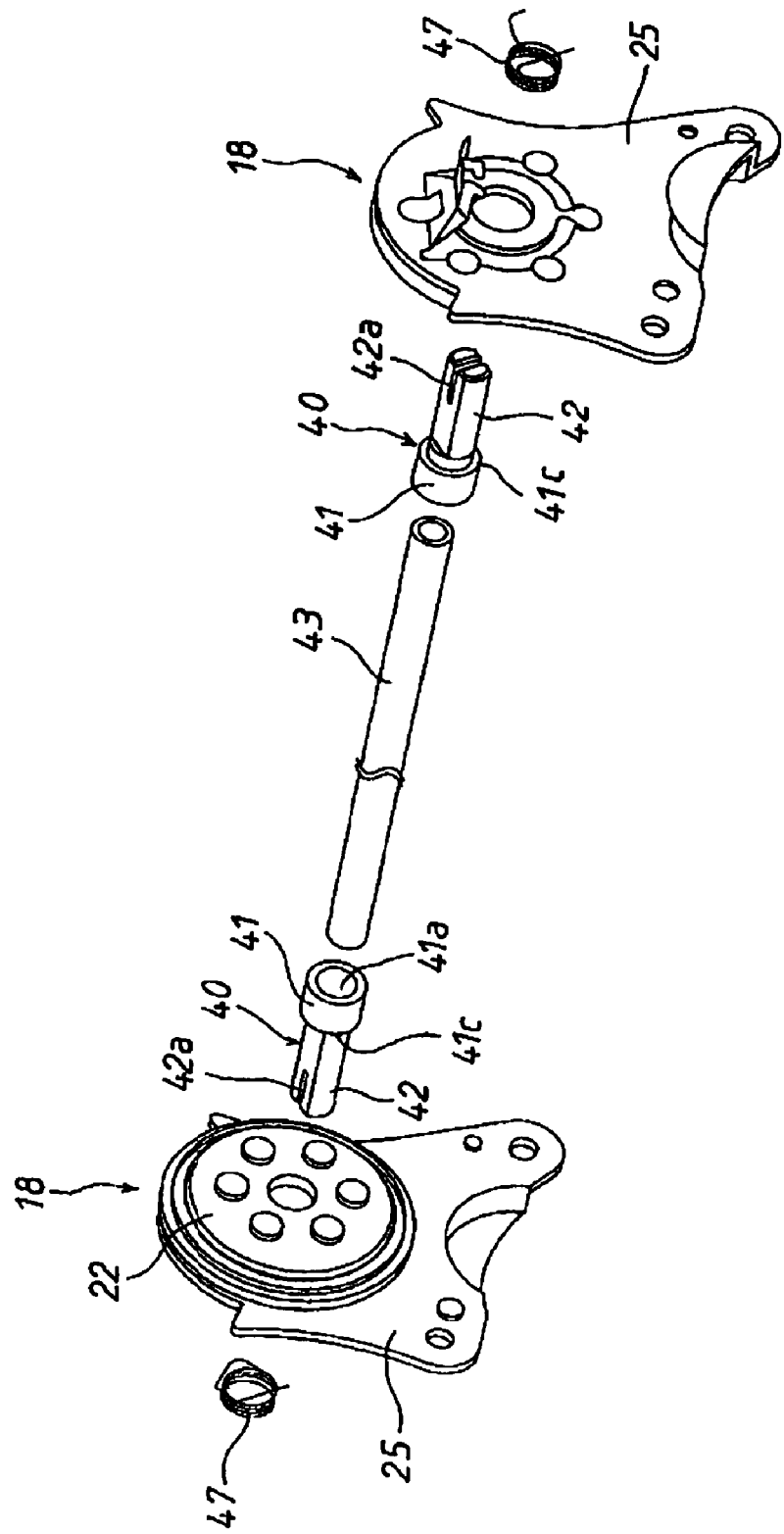
FIG. 3 is an exploded view illustrating the seat reclining apparatus for the vehicle according to the first embodiment.

As illustrated in FIGS. 2 and 3, the left and right reclining mechanisms 18 are provided at left and right sides of the vehicle seat 13 (left and right herein correspond to left and right sides of the vehicle in a width direction thereof), respectively. The left and right reclining mechanisms 18 are operated synchronously by means of a connecting pipe 43 (which will be described hereinbelow and which serves as a connecting member). Structures and functions of the left and right reclining mechanisms 18 (left and right herein correspond to left and right sides of FIG. 2) are substantially the same. However, the right reclining mechanism 18 differs from the left reclining mechanism 18 in having an operating lever 19 for locking and unlocking the lock mechanisms 17. A detailed structure of the right reclining mechanism 18 will be mainly described hereinbelow, as an example, with reference to FIG. 2.

As illustrated in FIG. 2, the reclining mechanism 18 includes a disc-shaped support arm 21 (which serves as a first arm) and a disc-shaped gear arm 22 (which serves as a second arm). The gear arm 22 is fitted to the support arm 21 so as to be relatively rotatable thereto. The support arm 21 is fixed at a lower frame 15a (see FIG. 1), which supports the seat cushion 15 and which is fixed on a vehicle floor 12, via a lower arm 25 (which serves as a first arm) by welding, for example. The gear arm 22 is fixed at an upper arm 26 (which serves as a second arm), which supports the seat back 16, by welding, for example. An arm holder 27 is fitted to outer circumferential portions of the support arm 21 and the gear arm 22. The support arm 21 and the gear arm 22 are engaged with each other so as not to be spaced away from each other, while allowed to rotate relative to each other by means of the arm holder 27. An inner space 28 is formed between the support arm 21 and the gear arm 22. The lock mechanism 17 whose structure will be described hereinbelow is accommodated in the inner space 28.

Figure 4:
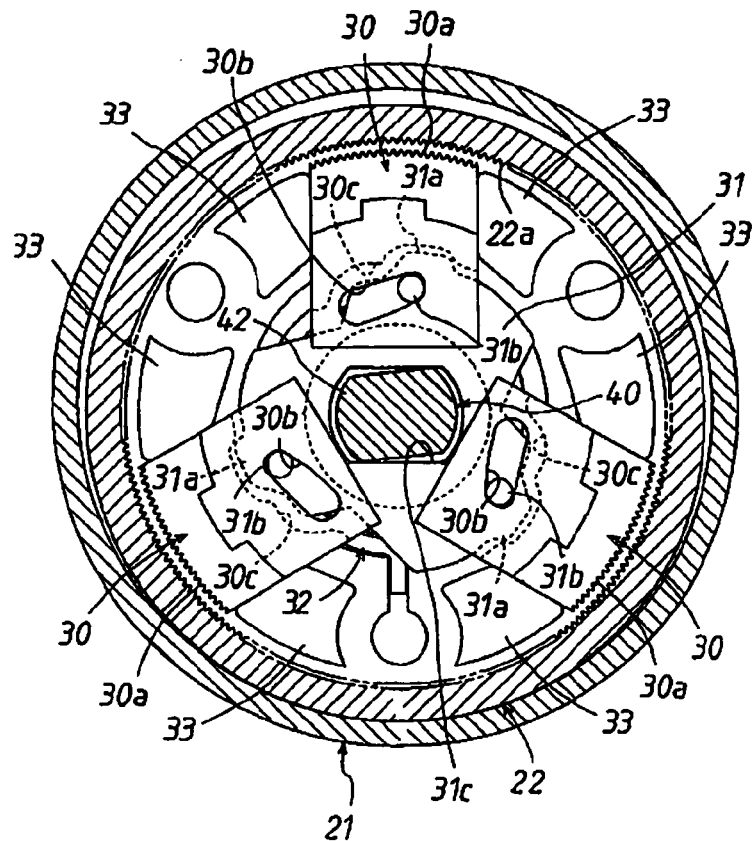
FIG. 4 is a cross-sectional view illustrating a lock mechanism according to the first embodiment taken along line IV-IV in FIG. 2.

As illustrated in FIG. 4, the lock mechanism 17 includes inner teeth portions 22a, three pawls 30, a cam 31 and a lock spring 32. The inner teeth portions 22a are formed at an inner circumferential surface of the gear arm 22. Each outer teeth portion 30a is formed at each of the pawls 30 so as to be engageable with the corresponding inner teeth portion 22a. Each of the pawls 30 is provided along a circumference of the cam 31. The cam 31 rotates between a locked position and an unlocked position for engaging and disengaging the outer teeth portions 30a of the pawls 30 with the corresponding inner teeth portions 22a. The lock spring 32 biases the cam 31 so that the cam 31 rotates in a predetermined direction.

Each of the pawls 30 is provided along the circumference of the cam 31 so as to be spaced away from each other, by forming a predetermined angle between each other. Further, the pawls 30 are guided by a guiding portion 33, which is provided at the support arm 21, so as to be movable in a radial direction of the cam 31. Elongated engaging holes 30b extending along the circumference of the cam 31 are formed at the corresponding pawls 30. Further, each of the elongated engaging holes 30b is formed so as to extend slightly aslant relative to a circular locus defined about a rotational center of the cam 31. Cam inner surfaces 30c, which contact cam surfaces 31a (described below) of the cam 31 respectively, are formed at the corresponding pawls 30.

Three of the cam surfaces 31a, which contact the corresponding cam inner surfaces 30c formed at the pawls 30, are provided along the circumference of the cam 31 so as to be spaced away from each other by forming predetermined angle between each other. Engaging pins 31b are provided at the cam 31 so as to protrude parallel with an axis of a rotation of the cam 31. Each of the engaging pins 31b is engaged with each of the elongated engaging hole 30b formed at each of the pawls 30. An engaging hole 31c, which is chamfered to have two chamfered portions, is formed at a center of the cam 31. A shaft portion 42 of a hinge pin 40 is movably inserted into the engaging hole 31c.

Insertion holes into which the hinge pin 40 is inserted are formed at radially immediate portions of the support arm 21 and the gear arm 22, respectively. As illustrated in FIGS. 2 and 3, one end of the hinge pin 40 is formed into a large diameter socket 41 (i.e. a diameter of the socket 41 is larger than a diameter of the connecting pipe 43). The other end of the hinge pin 40 is formed into the shaft portion 42 which is chamfered to have two chamfered portions. The shaft portion 42 is formed so as to be inserted into the engaging hole 31c of the cam 31 and the insertion holes of the support arm 21 and the gear arm 22. The shaft portion 42 is inserted into the engaging hole 31c of the cam 31 with a clearance allowed between the shaft portion 42 and the engaging hole 31c, so that the two chamfered portions of the shaft portion 42 is engaged with the engaging hole 31c of the cam 31. Therefore, a rotation of the shaft portion 42 is transmitted to the cam 31. Further, a slight movement of the cam 31 in the radial direction thereof relative to the shaft portion 42 is allowed. One end portion of the socket 41 of the hinge pin 40 is formed into a socket hole 41a, which is cylindrically-shaped so as to be coaxial with an axis of the hinge pin 40. A contacting base surface 41b is formed at a base surface of the socket hole 41a so as to be vertical relative to the axis of the hinge pin 40.

The operating lever 19 is integrally attached to the shaft portion 42 of the hinge pin 40 provided at the right reclining mechanism 18. The operating lever 19 adjusts the angle of the seat back 16 relative to the seat cushion 15. By operating the operating lever 19, the lock mechanisms 17 perform locking and unlocking operations. Thus, the pivotal movement of the seat back 16 relative to the seat cushion 15 is restricted and the restriction of the pivotal movement thereof is released.

The left and right hinge pins 40 are arranged so that the socket holes 41a of the large-diameter sockets 41 face each other. In such a state, the left and right hinge pins 40 are inserted from an inward of the vehicle seat 13 into the corresponding insertion holes formed at the support arms 21 and the gear arms 22 of the left and right reclining mechanisms 18 of the vehicle seat 13. Axial end portions of the cylindrically-shaped connecting pipe 43 are inserted into the socket holes 41a of the hinge pins 40, respectively. Further, left and right end surfaces of the connecting pipe 43 are formed so as to be vertical relative to an axis thereof. The connecting pipe 43 is inserted into each of the socket holes 41a until each of the end surfaces of the connecting pipe 43 contacts the contacting base surface 41b of the socket holes 41a. Thus, the connecting pipe 43 is fitted into inner surfaces of the corresponding sockets 41 of the hinge pins 40.

Stepped-shaped abutment surfaces 41c are formed at the corresponding hinge pins 40 so as to be vertical relative to the axes of the hinge pins 40. Each of the abutment surfaces 41c contacts with each end surface of the gear arm 22.

In other words, the connecting pipe 43 is inserted into the left and right socket holes 41a of the hinge pins 40. In such a state, an end surface of the shaft portion 42 of the hinge pin 40, which is inserted into the left reclining mechanism 18, is thrust towards the right reclining mechanism 18. Thus, the abutment surface 41c of the hinge pin 40, which is inserted into the right reclining mechanism 18, contacts the end surface of the right gear arm 22. Further, the left and right end surfaces of the connecting pipe 43 respectively contact with the contacting base surfaces 41b of the socket holes 41a of the hinge pins 40. In such a state, the axial end portions of the connecting pipe 43 are respectively connected to the left and right hinge pins 40 by welding. As illustrated in FIG. 2, the left and right hinge pins 40 are connected to the connecting pipe 43 by welding at connecting portions 50. Therefore, the hinge pins 40 and the connecting pipe 43 are coaxially connected. Further, a clearance CL is provided, in the axial direction of the hinge pin 40, between the end surface of the left gear arm 22 and the abutment surface 41c of the left hinge pin 40, which is inserted into the left reclining mechanism 18. A variation of the assembling position of the left reclining mechanism 18 relative to the right reclining mechanism 18 in the axial direction of the hinge pin 40 is offset by means of the clearance CL.

The sockets 41 of the left and right hinge pins 40, which are respectively connected to the left and right axial end portions of the connecting pipe 43, serve as connecting portions.

Second Embodiment

Figure 5:
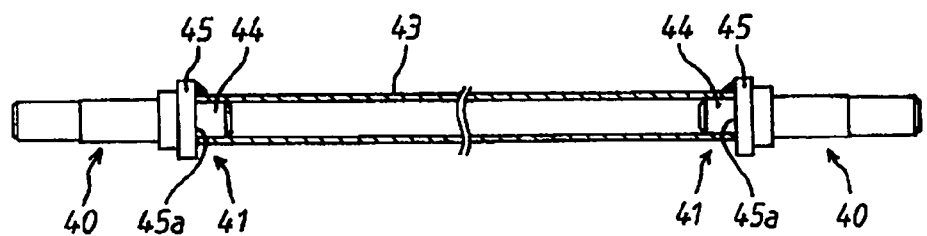
FIG. 5 is a cross-sectional view illustrating hinge pins and a connecting pipe of the seat reclining apparatus for the vehicle according to a second embodiment.

As illustrated in FIG. 5, each of the sockets 41 of the hinge pins 40 may be structured to have a socket shaft 44 and a socket flange 45. Each of the socket shafts 44 is inserted into the connecting pipe 43. Each of the socket flanges 45 includes a contacting surface 45a, which is provided so as to be contiguous with each of the socket shafts 44. In such a structure, each of the socket shafts 44 is inserted into the connecting pipe 43 until each of the end surfaces of the connecting pipe 43 contacts the corresponding contacting surface 45a. Thus, the connecting pipe 43 is fitted to outer surfaces of the socket shafts 44 of the sockets 41 of the hinge pins 40.

Third and Fourth Embodiment

Figure 6:
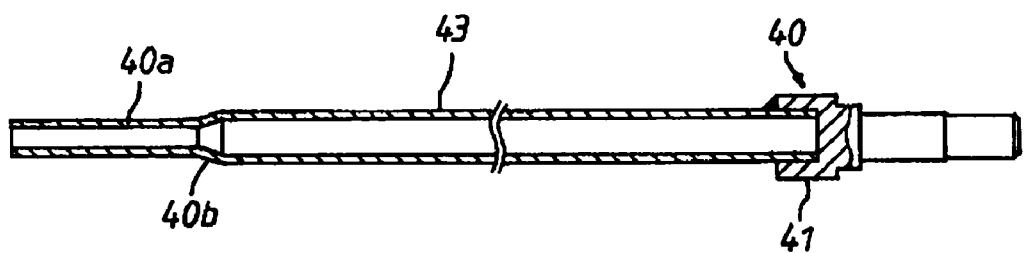
FIG. 6 is a cross-sectional view illustrating the hinge pins and the connecting pipe of the seat reclining apparatus for the vehicle according to a third embodiment.
Figure 7:
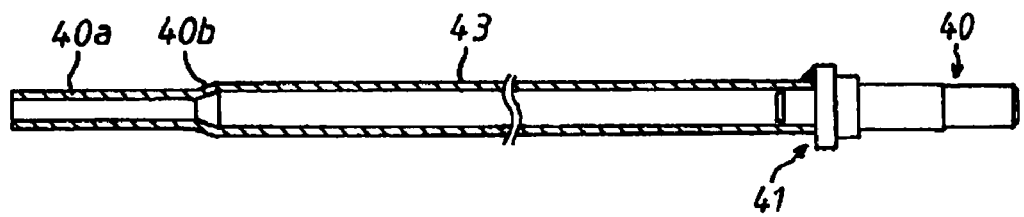
FIG. 7 is a cross-sectional view illustrating the hinge pins and the connecting pipe of the seat reclining apparatus for the vehicle according to a forth embodiment.

As illustrated in FIGS. 6 and 7, the connecting pipe 43 is fitted to either an inner or an outer surface of the hinge pin 40. The hinge pin 40 may be provided only at the cam 31 of the right reclining mechanism 18. In such a case, the connecting pipe 43 may be directly inserted into the cam 31 of the left reclining mechanism 18. More specifically, a hinge pin 40a and an abutment surface 40b may be integrally formed at the connecting pipe 43. The hinge pin 40a is engaged with the engaging hole 31c of the cam 31 of the left reclining mechanism 18. The hinge pin 40a is chamfered to have two chamfered portions. The hinge pin 40, which is provide at the right reclining mechanism 18, serves as one of the hinge pins and the hinge pin 40a, which is formed at the connecting pipe 43, serves as the other one of the hinge pin.

As illustrated in FIG. 2, return springs 48 are arranged in such a way that one end of each of the return springs 48 is engaged with each bracket 46 fixed at the upper arm 26. The other end of each of the return springs 48 is engaged with each bent portion 25a of the lower arm 25. The return springs 48 constantly apply biasing force to the corresponding upper arms 26 in a direction in which the seat back 16 is inclined towards the front direction of the vehicle. When the lock mechanisms 17 are unlocked by operating the operating lever 19, the seat back 16 is inclined towards the front direction of the vehicle by means of the biasing force.

As illustrated in FIG. 2, torque springs are arranged in such a way that one end of each of the torque springs 47 is engaged with each of the bent portions 25a of the lower arm 25. The other end of each of the torque springs 47 is engaged with each slit 42a, which is formed at an end portion of each of the shaft portions 42 of the hinge pins 40. The torque springs 47 apply rotational biasing forces to the corresponding hinge pins 40. The shaft portions 42 of the hinge pins 40 are respectively engaged with the engaging holes 31c of the cams 31 at the two chamfered portions of the shaft portions 42 and that of the engaging holes 31c by means of the rotational biasing forces. Therefore, a backlash is prevented from being generated between the shaft portions 42 and the corresponding engaging holes 31.

An assembling procedure of the above-described reclining apparatus 10 will be described hereinbelow. The reclining mechanisms 18 are placed at the left and right sides of the vehicle seat 13. Then, the hinge pins 40 are arranged so that the socket holes 41a of the large-diameter sockets 41 face each other. In such a state, each of the hinge pins 40 is inserted from the inward of the vehicle seat 13 into each of the insertion holes of the support arms 21, each of the insertion holes of the gear arms 22 and each of the engaging holes 31c of the cam 31 of the reclining mechanism 18.

Then, each of the axial end portions of the connecting pipe 43 is inserted into each of the socket holes 41a of the hinge pins 40 while an interval between the left and right reclining mechanisms 18 is adjusted. In such a state, the end surface of the shaft portion 42 of the hinge pin 40, which is inserted into the left reclining mechanism 18, is thrust towards the right reclining mechanism 18. Thus, the stepped-shaped abutment surface 41c of the hinge pin 40, which is inserted into the right reclining mechanism 18, contacts the end surface of the right gear arm 22. Further, the end surfaces of the connecting pipe 43 respectively contact the contacting base surfaces 41b of the socket holes 41a of the hinge pins 40.

Since the hinge pin 40 of the left reclining mechanism 18 is thrust towards the right reclining mechanism 18, force is transmitted from the left hinge pin 40 to the right hinge pin 40 through the connecting pipe 43. More specifically, the abutment surface 40c of the right hinge pin 40 is thrust to the end surface of the right gear arm 22. Further, the right end surface of the connecting pipe 43 is thrust until contacting the contacting base surface 41b of the socket hole 41a of the socket 41 of the right hinge pin 40. Furthermore, the contacting base surface 41b of the socket hole 41a of the socket 41 of the left hinge pin 40 is thrust until contacting the other end surface of the connecting pipe 43.

The contacting base surfaces 41b of the socket holes 41a and end surfaces of the connecting pipe 43 are formed to be vertical relative to the axes of the hinge pins 40 and the connecting pipe 43, respectively. Further, the axial end portions of the connecting pipe 43 are inserted into the corresponding socket holes 41a of the hinge pins 40 with a clearance formed therebetween. Therefore, by thrusting the hinge pins 40, the hinge pins 40 and the connecting pipe 43 are coaxially assembled.

In the above-described state, joint portions of each end surface of each of the sockets 41 of the hinge pins 40 and an outer circumferential surface of the connecting pipe 43 are connected by welding to form the connecting portion 50. Thus, each of the hinge pins 40 and the connecting pipe 43 are coaxially and integrally connected. After the hinge pins 40 and the connecting pipe 43 are connected, the operating lever 19 is fixed at the shaft portion 42 of the hinge pin 40, which is provided at the right reclining mechanism 18. Therefore, the right reclining mechanism 18 is disposed between the abutment surface 41c of the right hinge pin 40 and the operating lever 19. Accordingly, a displacement of the right hinge pin 40 relative to the right reclining mechanism 18 in the axial direction thereof is restricted and the right reclining mechanism 18 is only allowed to rotate.

Subsequently, a seat back frame is fixed at the left and right upper arms 26 of the left and right reclining mechanisms 18, by welding, for example. The seat back frame supports the seat back 16. The right upper arm 26 of the right reclining mechanism 18 is fixed at one end of the seat back frame. The left upper arm 26 of the left reclining mechanism 18 is fixed at the other end of the seat back frame. The upper arm 26 of the right reclining mechanism 18 is connected to the seat back frame at a predetermined position relative to the hinge pins 40 and the connecting pipe 43. On the other hand, the clearance CL is provided at the left reclining mechanism 18 between the abutment surface 41c of the left hinge pin 40 and the end surface of the left gear arm 22, in the axial direction of the hinge pins 40 and the connecting pipe 43. Therefore, the variation of the assembling position of the left reclining mechanism 18 relative to the right reclining mechanism 18 is offset. Accordingly, the lock mechanisms 17 stably perform the locking and unlocking operations.

An operation of the reclining apparatus 10 will be described hereinbelow. The operations of the left and right reclining mechanisms 18 are substantially the same. Therefore, the operation of the right reclining mechanism 18 will be mainly described hereinbelow. By operating the operating lever 19, the cam 31 is rotated against the biasing force of the lock spring 32 from the locked position to the unlocked position. When the cam 31 is rotated, the engaging pins 31b of the cam 31 and the corresponding elongated engaging holes 30b of the pawls 30 are engaged. Therefore, a plurality of the pawls 30 is synchronously moved inward in the radial direction of the cam 31, guided by the guiding portion 33. Accordingly, as illustrated in FIG. 4, the outer teeth portions 30a of the pawls 30 are released from the corresponding inner teeth portions 22a. Therefore, the lock mechanism 17 performs the unlocking operation. When the lock mechanism 17 performs the unlocking operation, a restriction of a rotational movement of the gear arm 22 relative to the support arm 21 is released. As a result, the angle of the seat back 16 relative to the seat cushion 15 is adjusted.

Further, when the operating lever 19 is released, the cam 31 is rotated in a counter-clockwise direction in FIG. 4 by means of the biasing force of the lock spring 32. Then, the pawls 30 are moved outward in the radial direction of the cam 31 by means of the cam surfaces 31a of the cam 31, which are engaged with the corresponding cam inner surfaces 30c of the pawls 30. Therefore, the outer teeth portions 30a of the pawls 30 are engaged with the corresponding inner teeth potions 22a. Thus, the lock mechanism 17 performs the locking operation. Accordingly, the rotational movement of the gear arm 22 relative to the support arm 21 is restricted. As a result, the angle of the seat back 16 relative to the seat cushion 15 is fixed. The shaft portion 42 of the hinge pin 40 is engaged with the engaging hole 31c of the cam 31 with the clearance allowed between the shaft portion 42 and the engaging hole 31c in the radial direction of the cam 31. Therefore, the three of the pawls 30, which are provided along the circumference of the cam 31, are engaged with the corresponding inner teeth portions 22a, by an equal force.

According to the embodiments, the left and right hinge pins 40 are respectively inserted into the left and right reclining mechanisms 18 from the inward of the vehicle seat 13. Further, the hinge pins 40 include the sockets 41, respectively. The sockets 41 are formed at corresponding inner ends of the hinge pins 40 facing each other, and are joined with the connecting pipe 43. Therefore, by thrusting one of the hinge pins 40 towards the other hinge pin 40, a backlash is prevented from being generated between the sockets 41 of the hinge pins 40 and the connecting pipe 43 in the axial direction of the hinge pins 40 and the connecting pipe 43. Accordingly, the sockets 41 of the hinge pins 40 and the connecting pipe 43 are surely connected.

According to the embodiments, the sockets 41 are connected to the connecting pipe 43 by welding. Therefore, the hinge pins 40 and the connecting pipe 43 are easily and surely connected with each other.

According to the embodiments, each of the hinge pins 40 includes the socket 41 and the abutment surface 41c. End portions of the connecting pipe 43 are inserted into the corresponding sockets 41. Each of the abutment surfaces 41c contacts an inner side surface of the reclining mechanism 18 ("inner" herein refers to an inner side of the vehicle seat). Therefore, by thrusting one of the hinge pins 40 towards the other hinge pin 40, one of the abutment surfaces 41c of the hinge pin 40 contacts the one of the reclining mechanisms 18. Thus, the clearance CL is provided between the abutment surface 41c and the one of the reclining mechanisms 18. Therefore, the variation of the assembling position of one of the reclining mechanisms 18 relative to the other reclining mechanism 18 is suitably offset. As a result, the lock mechanisms 17 stably perform the locking and unlocking operations.

According to the embodiments, the socket holes 41a are formed at the corresponding sockets 41. Each of the socket holes 41a includes the contacting base surface 41b, which contacts the end surface of the connecting pipe 43. Therefore, by thrusting one of the hinge pins 40 towards the other hinge pin 40, the end surfaces of the connecting pipe 43 contact the corresponding contacting base surfaces 41b of the socket holes 41a. Accordingly, the hinge pins 40 and the connecting pipe 43 are coaxially assembled.

According to the embodiments, the socket holes 41a of the sockets 41 and the connecting pipe 43 are cylindrically shaped. Thus, shapes of the connecting pipe 43 and the sockets 41 are simplified. Therefore, manufacturing cost is decreased.

According to the embodiment, the socket flanges 45 and the socket shafts 44 are formed at the corresponding sockets 41 of the hinge pins 40. Each of the socket flanges 45 includes the contacting surface 45a, which contacts the end surface of the connecting pipe 43. Each of the socket shafts 44 is inserted into the end portion of the connecting pipe 43. Accordingly, the hinge pins 40 and the connecting pipe 43 are coaxially assembled.

According to the embodiments, when assembling the connecting pipe 43 by thrusting one of the hinge pins 40, the abutment surface 41c of the other hinge pin 40 is thrust to the end surface of the gear arm 22 of the reclining mechanism 18. However, where the abutment surface 41c of the other hinge pin 40 is thrust does not have to be the gear arm 22. Instead, one of the abutment surfaces 41c of the hinge pin 40 may be thrust to a part of one of the reclining mechanisms 18.

Further, according to the embodiments, the lower frames 15a are directly fixed on the vehicle floor 12. However, for a vehicle having a lifter apparatus for vertically adjusting a position of a vehicle seat, the lower frames 15a are mounted on the vehicle floor 12 via the lifter apparatus.

Still further, the reclining mechanisms 18 according to the embodiment are not limitedly mounted on the above-described vehicle seat 13. The reclining mechanisms 18 according to the embodiments may be mounted on any seat in which left and right reclining mechanisms are connected to each other through the connecting pipe 43.

Furthermore, according to the embodiments, each of the support arms 21 and each of the lower arms 25 are separately formed. However, each of the support arms 21 and each of the lower arms 25 may be integrally formed. Likewise, according to the embodiments, each of the gear arms 22 and each of the upper arms 26 are separately formed. However, each of the gear arms 22 and each of the upper arms 26 may be integrally formed.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A seat reclining apparatus for a vehicle comprising:
a pair of first arms adapted to support a seat cushion of a seat;
a pair of second arms adapted to support a seat back of the seat and be rotatably supported relative to the first arms;
a pair of hinge pins inserted thorough the first arms and the second arms;
a pair of reclining mechanisms including
a pair of lock mechanisms, each of which includes a cam provided between the first arm and the second arm and supported by the hinge pin so as to be integrally rotatable, keeping a clearance between the cam and the hinge pin, the lock mechanism restricting a rotational movement of the seat back relative to the seat cushion and releasing a restriction of the rotational movement of the seat back relative to the seat cushion, by means of a rotational movement of the hinge pins and the cams; and
a connecting member provided between the reclining mechanisms and connected to the hinge pins so as to be integrally rotatable, wherein
each of the hinge pins is structured so as to be inserted into each of the reclining mechanisms from an inward position of the seat to an outward position of the seat, and
a connecting portion is provided at an inner end of the hinge pins facing the other one of the hinge pins and is connected to the connecting member,
wherein the connecting portion includes a socket into which an end portion of the connecting member is fitted, and an abutment portion configured to contact an inner surface of one of the reclining mechanisms, the inner surface of the one reclining mechanism facing the other one of the reclining mechanisms.

2. The seat reclining apparatus for the vehicle according to claim 1, wherein the connecting portion is connected to the connecting member by welding.

3. The seat reclining apparatus for the vehicle according to claim 1, wherein a socket hole, which includes a contacting base surface contacting an end surface of the connecting member and into which the end portion of the connecting member is fitted, is formed at the socket of the connecting portion.

4. The seat reclining apparatus for the vehicle according to claim 3, wherein the socket hole of the socket and the connecting member are cylindrically shaped.

5. The seat reclining apparatus for the vehicle according to claim 1, wherein the socket hole of the socket and the connecting member are cylindrically shaped.

6. The seat reclining apparatus for the vehicle according to claim 1, wherein a socket flange, which has a contacting surface contacting an end surface of the connecting member, and a socket shaft, which is inserted into the end portion of the connecting member, are formed at the socket of the connecting portion.

7. The seat reclining apparatus for the vehicle according to claim 6, wherein the connecting member is cylindrically shaped.

8. The seat reclining apparatus for the vehicle according to claim 1, wherein the socket has a concaved portion with a bottom wall.

9. The seat reclining apparatus for the vehicle according to claim 8, wherein the end portion of the connecting member is in abutment with the bottom wall of the concaved portion.

* * * * *